United States Patent [19]
Hanks et al.

[11] 3,837,120
[45] Sept. 24, 1974

[54] DISHWASHER INNER DOOR PANEL AND GASKET ARRANGEMENT

[75] Inventors: Jack G. Hanks, Bethel Park, Pa.; Olan L. Long, Columbus, Ohio

[73] Assignee: Westinghouse Electric Corporation, Pittsburgh, Pa.

[22] Filed: May 15, 1972

[21] Appl. No.: 253,487

[52] U.S. Cl. ................................. 49/489, 312/296
[51] Int. Cl. .............................................. E06b 7/23
[58] Field of Search ...... 49/489, 498; 312/296, 327, 312/328; 220/46; 277/9

[56] References Cited
UNITED STATES PATENTS
2,952,053  9/1960  Frehse ................................. 49/489
3,210,144  10/1965  Ullman, Jr. et al. ............. 312/296 X FOREIGN PATENTS OR APPLICATIONS
932,452  9/1955  Germany ........................... 312/292

Primary Examiner—Kenneth Downey
Attorney, Agent, or Firm—E. C. Arenz

[57] ABSTRACT

The inner panel is formed of a single sheet of steel with a bulbous gasket retaining groove being formed as an integral part of the panel, as distinguished from a gasket retaining channel attached to a panel as a separate piece. The preferred gasket has a base portion which is generally complementary in shape to the cross-sectional shape of the groove, with both the base and sealing sections of the gasket being hollow. To facilitate the assembly of the gasket to the groove, the web between the base and sealing sections is provided with a tracking groove which aids in forcing the gasket into place by rolling a wheel along the length of the gasket.

6 Claims, 7 Drawing Figures

PATENTED SEP 24 1974  3,837,120
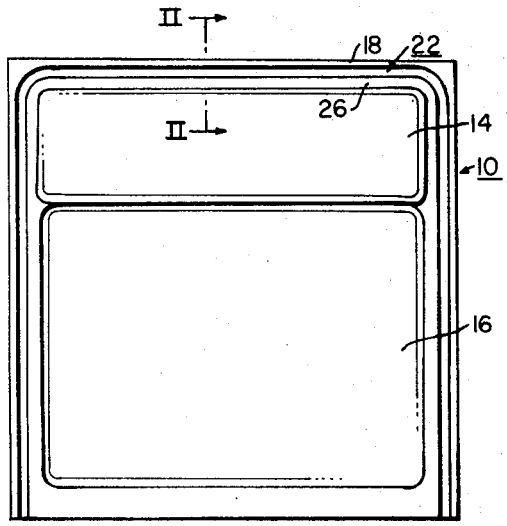
FIG.1
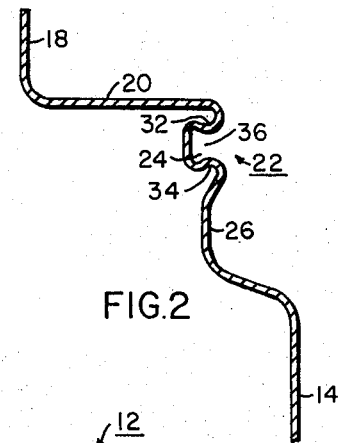
FIG.2
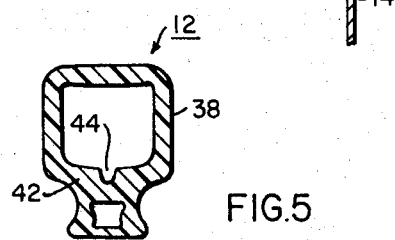
FIG.5
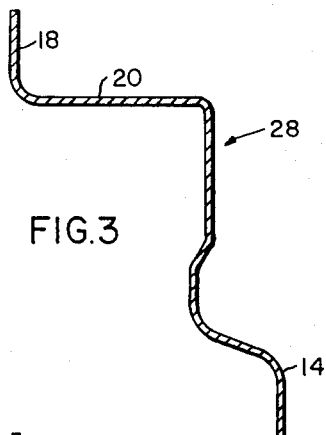
FIG.3
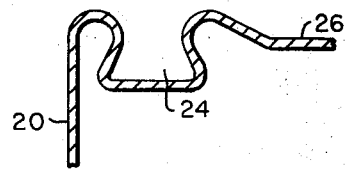
(unlabeled detail)
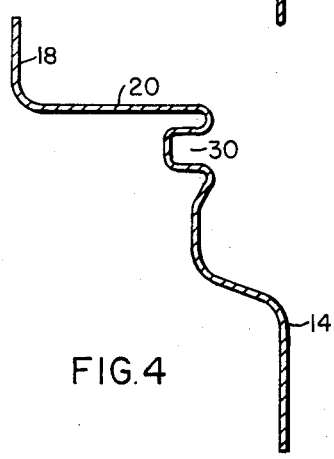
FIG.4
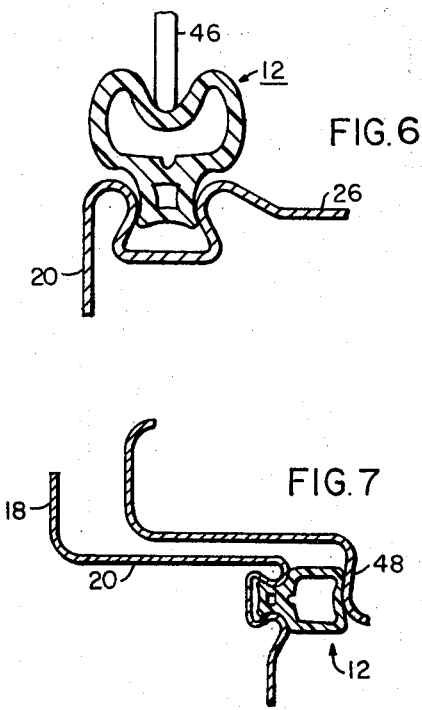
FIG.6
FIG.7

DISHWASHER INNER DOOR PANEL AND GASKET ARRANGEMENT

BACKGROUND OF THE INVENTION

1. Field of the Invention

The invention pertains to the art of dishwasher doors and gasket arrangements therefor.

2. Description of the Prior Art

Sealing gaskets for dishwasher doors hinged along their lower edge are in some cases applied to the inside corner of the tub open face and, in other cases, are applied to the marginal portions of the door itself. Those gaskets which have been typically applied to the tub require substantial mounting and fastening hardware which is disadvantageous both from the standpoint of cost and assembly time.

In one arrangement for mounting the gasket to the inner panel of the door, as shown in U.S. Pat. No. 3,603,035, the gasket is provided with a plurality of projecting mounting tabs which are arranged to be received in a plurality of spaced apertures provided in the inner panel along the marginal portion of the door where the gasket is to be located. While this type of gasket can be initially formed by extruding, it requires cutting away those portions of the gasket between the mounting tabs.

In another commercially available dishwasher, a member which is generally channel-shaped in section is welded to the inner face of the inner panel along those marginal portions where the gasket is to be located, and the extruded gasket, which does not require projecting mounting tabs, is held in captured relation by the channel. In our opinion, the separately attached channel arrangement has several disadvantages as contrasted to an arrangement according to our invention. One important disadvantage is that with the channel welded on, it is difficult to obtain satisfactory porcelain enameling of the inner panel because of the small cracks and crevices in which fluids associated with the cleaning of the metal, such as pickling fluids, become trapped and are difficult to satisfactorily remove.

SUMMARY OF THE INVENTION

In accordance with our invention, the inner panel of the door is formed of a single sheet of steel with the gasket retaining groove being press formed in the sheet to extend along the marginal portions where the gasket is to be located. The gasket retaining groove has a cross-sectional shape including a bulbous shape recessed from the plane of the margin and with the opening of the groove being of restricted width and lying generally in the plane of the margin. With this arrangement, a gasket having a base section generally complementary in cross-sectional shape with the cross-sectional shape of the groove may be pressed in and frictionally retained in the groove, without additional mounting parts required.

We consider that one distinct part of our contribution to this art stems from our recognition of the possibility that a continuous groove with a narrowed opening could, in a commercially practical way, be formed in the single sheet of steel which is to serve as the inner panel of a dishwasher door. By providing this groove as an integrally formed part of the inner panel, as distinct from a separately welded channel, the corners and rims of the channel as viewed in cross-section form relatively smooth curves and avoid crevices which would create problems in cleaning and preparing the steel sheet for enameling. Further, the channel formed into the sheet itself adds substantial rigidity to the sheet, without a significant increase in weight.

BRIEF DESCRIPTION OF THE DRAWING

FIG. 1 is a face view of the inner face of an inner panel for a dishwasher door according to the invention;

FIG. 2 is a sectional view corresponding to one taken along line II—II of FIG. 1;

FIG. 3 is a sectional view of a marginal portion of the sheet material of FIG. 2 illustrating its configuration in a first stage of press forming;

FIG. 4 is a sectional view similar to FIG. 3 illustrating a second stage in the press forming;

FIG. 5 is a fragmentary sectional view illustrating a gasket in position to be placed in the gasket retainer groove;

FIG. 6 is a sectional view similar to FIG. 5 with the gasket being forced into place in the groove; and FIG. 7 is a sectional view illustrating the gasket in the groove and with that portion of the inner panel in sealing relation to a sealing surface on the tub.

DESCRIPTION OF THE PREFERRED EMBODIMENT

In FIG. 1, the inner panel generally designated 10 is cold press formed from a single sheet of steel to provide the various contours desired. The gasket 12 is shown in installed position in FIG. 1. The gasket is a single length of extruded vinyl material which extends across the top marginal portion of the door, and down along both side marginal portions of the door and terminates adjacent the bottom edge of the door at both sides by being directed under the lower edge and toward the outside face of the door. The seal arrangement for the dishwasher tub and door along the bottom edge of the door is not shown since it forms no part of our invention.

In press forming the single sheet, a top rectangular area 14 is embossed in a direction toward the viewer in FIG. 1, and a lower rectangular area 16 is embossed in a direction away from the viewer. The upper area 14 provides an increased volume space between the inner panel 10 and the outer face (not shown) of the door for timer and other components to be installed in the door space. The lower area 16 accommodates a forward projection of the lower slide-out dish rack (not shown) as is conventional.

In press forming the single steel sheet to form the inner panel, various contours are provided in the panel which are best seen for purposes of description of the invention in FIG. 2. These contours include an outer peripheral flange 18 which forms approximately a right angle with the section 20 which extends to the marginal edge portion generally designated 22 which includes the gasket retainer groove 24. This general configuration is the same along both side portions and the top portion of the inner panel. In the top portion of the inner panel the marginal edge portion is spaced from the inwardly-directed area 14 by an intermediate section 26. In the lower portion of the panel where the outwardly-directed area 16 is located, the configuration would be the same except that the direction of the area 16 would be reversed from that shown in FIG. 4 for the area 14.

The single sheet of steel forming the inner panel undergoes several stages of press forming to obtain the ultimately desired configuration. In FIG. 3, the initial form of the edge material which will ultimately be contoured to correspond to FIG. 2 as shown. After the FIG. 3 configuration is formed, the sheet is subjected to another cold press forming operation in which the area of the sheet generally designated 28 in FIG. 3 has a parallel walled channel 30 (FIG. 4) formed therein from the material area designated 28 of FIG. 3. Thereafter, the bight of the channel is backed up and a further press forming operation occurs in which the channel 30 is in effect squashed slightly to provide the bulged gasket retaining groove 24 shown in FIG. 2. As there shown, the groove 24 is formed by opposite side wall portions 32 and 34 which converge toward the opening 36 of the groove which is of restricted width relative to the greater lateral dimensions in the depth of the groove.

As far as we know, forming bulged (i.e., undercut) relatively long grooves in a panel of the character and size required for the inner panel of a dishwasher door is not considered to be a typical or conventional cold press forming operation, as evidenced by the skepticism expressed by at least those whom we know as skilled in the art of such forming operations. However, such grooves are capable of being so formed in a commercially practicable way, and result in a number of advantages mentioned for an inner door panel.

Referring to FIG. 5, the gasket 12 may be formed of extruded vinyl or of other materials having satisfactory properties for gasket use, and includes a hollow sealing section 38 and a hollow base section 40. In cross-section, the sealing section is approximately square, while the base section has a shape in outline generally complementary to the interior shape of the groove 24. The essential character of the base cross-section is that it includes a maximum lateral dimension, which as shown is the base part of the base section, that is sufficiently in excess of the width of the opening 36 of the groove that the gasket will be satisfactorily retained by the groove once it is installed. The hollow part of the base section permits sufficient deformation of the base section that the gasket can be relatively easily installed. The web portion 42 separating the seal section 38 and the base section 40 includes what is here called a tracking groove 44 which is aligned with the longitudinal axis of the gasket.

To install the gasket, the necessary length of gasket is aligned with the gasket retainer groove in overlying relation. Then, as shown in FIG. 6, a narrow periphery wheel 46 is rolled along the longitudinal axis of the gasket with a downward force applied to force the top surface of the gasket down against the tracking groove 44, which in turn causes the gasket base to deflect generally as shown in FIG. 6 so that the gasket is forced into its seated position as shown in FIG. 7.

FIG. 7 shows the position of the inner panel with the seated gasket relative to a sealing surface 48 of a dishwasher tub, such as that shown in Long U.S. Pat. application Ser. No. 141,685 filed May 10, 1971.

The resulting arrangement from the invention is considered desirable in that the bulged gasket retaining groove is machine formed as distinguished from constituting a separate piece welded to the inner panel, the rigidity of the inner panel is substantially increased without a commensurate increase in weight, and the surfaces associated with the groove are rounded and smooth so that the inner panel may be readily porcelain enameled if desired.

We claim:

1. A dishwasher door inner panel cold press formed from a single steel sheet having an uninterrupted gasket retaining groove recessed into the face of said sheet along the marginal edge portions of at least three sides of said panel, said groove being generally channel-shaped in cross-section with an open throat of lesser width than the interior width of said groove, and a gasket having a base of a shape generally complementary with said groove seated in said groove.

2. A dishwasher door inner panel according to claim 1 wherein:
   said channel is formed of relatively smoothly curved edges and corners.

3. A dishwasher door inner panel formed of a single steel sheet which is cold press formed to include an uninterrupted gasket retaining groove extending along the panel marginal portion at at least three sides of said panel, said groove being in recessed relation to the face of said panel marginal portion and having a constricted open side relative to the lateral width of the groove at its base, and a gasket having a compressively resilient base portion of a shape generally complementary with the cross-sectional shape of said groove, said gasket base being sealed in said groove, and a compressively resilient sealing section extending away from the face of said panel marginal portion.

4. A dishwasher door inner panel according to claim 3 wherein:
   said gasket base portion and said sealing section are hollow.

5. A dishwasher door inner panel according to claim 4 wherein:
   said gasket includes a web between said sealing section and said base section, and said web includes a tracking groove therein for facilitating the alignment of the base with said groove as said base is being pressed into said groove.

6. A dishwasher door inner panel according to claim 3 wherein:
   said inner panel includes a porcelain enameled coating on said steel sheet.

* * * * *